United States Patent [19]

LaVanture et al.

[11] 4,430,313

[45] Feb. 7, 1984

[54] SHIPPING BLACK PHOSPHORIC ACID

[75] Inventors: Mark D. LaVanture; George L. Walker, both of Richmond, Va.

[73] Assignee: Mobil Oil Corporation, New York, N.Y.

[21] Appl. No.: 482,277

[22] Filed: Apr. 11, 1983

Related U.S. Application Data

[63] Continuation of Ser. No. 177,033, Aug. 11, 1980, abandoned.

[51] Int. Cl.³ .............................................. C01B 25/16
[52] U.S. Cl. .................................. 423/321 R; 423/320
[58] Field of Search .................... 423/319, 320, 321 S, 423/321 R

[56] References Cited

U.S. PATENT DOCUMENTS

| | | | |
|---|---|---|---|
| 3,423,170 | 1/1969 | Edwards | 423/313 |
| 4,048,289 | 9/1977 | Pierres | 423/321 R |
| 4,279,877 | 7/1981 | Hill et al. | 423/321 R |

FOREIGN PATENT DOCUMENTS

| | | | |
|---|---|---|---|
| 617322 | 3/1961 | Canada | 423/321 R |
| 555078 | 11/1931 | Fed. Rep. of Germany | 423/321 R |
| 54-119397 | 9/1979 | Japan | 423/321 R |

*Primary Examiner*—Gregory A. Heller
*Attorney, Agent, or Firm*—A. J. McKillop; M. G. Gilman; E. F. Kenehan, Jr.

[57] ABSTRACT

Black wet process phosphoric acid contains suspended and precipitated organic material and inorganic material. Upon standing, the precipitated material (mostly gypsum) forms a cake that is very difficult to be resuspended. By adding small amounts of nitric acid to the black acid, the nature of the precipitated material is changed and it does not cake and can be easily resuspended with slight agitation. Thus, the treated black acid can be shipped and stored and it can be clarified at the destination by adding water.

5 Claims, No Drawings

SHIPPING BLACK PHOSPHORIC ACID

This is a continuation of copending application Ser. No. 177,033 filed Aug. 11, 1980, now abandoned.

BACKGROUND OF THE INVENTION

1. Field of the Invention

This invention is concerned with the treatment of black wet process phosphoric acid and with the treated acid.

2. Description of the Prior Art

Insofar as is now known, the treating method of this invention has not been proposed.

SUMMARY OF THE INVENTION

This invention provides a method for improving shippability of black wet process phosphoric acid that comprises admixing with said black acid between about 0.5 weight percent and about 5 weight percent $HNO_3$. It also provides the thus treated black acid.

DESCRIPTION OF SPECIFIC EMBODIMENTS

As is well known in the art, black wet process phosphoric acid (black acid), obtained by treating phosphate rock with sulfuric acid, contains suspended and precipitated organic material and inorganic material. Upon standing much of this material will settle and cake, leaving a black supernatant liquor. After such material has settled and caked, it is extremely difficult to re-suspend it.

Because of the caking of the settled material, some grades of black acid cannot be shipped any great distance nor can it be stored satisfactorily for very long. In many cases, the caked material resting on the bottom of a tank car, storage tank, or other container presents a serious and difficult problem of removal. Vigorous agitation fails to re-suspend the caked material.

In co-pending application Ser. No. 177,034, filed concurrently with this application by the same inventors named herein, it is disclosed that black acid can be clarified by admixing with it a small amount of nitric acid and sufficient water to effect clarification.

It is the discovery of this invention that when nitric acid is admixed with black acid without adding water the settled material does not cake and it can be readily re-suspended with gentle agitation. Indeed, it appears that the usual movements of a vehicle, such as a tank car, carrying nitric acid treated black acid will be sufficient to keep the solid material in suspension. It has also been found that when the nitric acid treated black acid reaches its destination it can be clarified by adding the required amount of water thereto.

Generally, concentrated nitric acid containing about 70-72% $HNO_3$ can be used. More concentrated acid can be used, however, including fuming nitric acid containing 90% or more $HNO_3$. The amount of nitric acid ($HNO_3$) used is generally between about 0.25 weight percent and about 5 weight percent, based upon the total weight of the final mixture, and preferably between about 0.5 percent and about 3.5 percent. The amount used will depend somewhat on the nature of the particular black acid to be treated, i.e., whether it is a "clean" acid (relatively low impurity content) or a "dirty" acid (relatively high impurity content).

In the following examples, two black acids were used. Acid A was a typical "clean" acid and Acid B was a "dirty" acid. Typical analyses of these acids, in weight percent, are estimated as follows:

|  | Acid A | Acid B |
| --- | --- | --- |
| $P_2O_5$ | 53.6 | 50 |
| $H_3PO_4$ | 74 | 70 |
| $H_2SO_4$ | 2 | 5 |
| Other impurities | 2 | 5 |
| $H_2O$ | 22 | 20 |

In the following examples, all parts and percents are by weight.

EXAMPLES 1 THROUGH 3

Blends of Acid A and 70% nitric acid were prepared as follows, expressed in parts:

| Example | Acid A | 70% Nitric Acid |
| --- | --- | --- |
| 1 | 99.3 | 0.7 |
| 2 | 98.6 | 1.4 |
| 3 | 97.2 | 2.8 |

After standing for about 66 days, each blend had an off-white precipitate. Blends 1 and 2 had clear light green supernatant liquor and Blend 3 had a slightly hazy supernatant liquor. The precipitated material in all blends did not cake and was readily re-suspended with mild agitation.

EXAMPLES 4 THROUGH 6

Blends of Acid B and 70% nitric acid were prepared as follows, expressed in parts:

| Example | Acid B | 70% Nitric Acid |
| --- | --- | --- |
| 4 | 99 | 1 |
| 5 | 97 | 3 |
| 6 | 95 | 5 |

After standing for about 131 days, all blends had a light colored precipitate and a very dark supernatant liquor. The precipitated material in all blends did not cake and was readily re-suspended with mild agitation.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for transporting black wet process phosphoric acid without the removal of settled material, said method comprising the steps of:
    (i) admixing a small amount of $HNO_3$ with said black acid, said amount of $HNO_3$ being sufficient to render settled material in said black acid resuspendable with mild agitation; and
    (ii) transporting said black acid of step (i) in a storage tank of a moving vehicle, wherein the movement of said vehicle creates sufficient agitation of said black acid to keep said solid material in suspension, whereby the settled material of said black acid in the absence of said mixing step (i) would have formed a cake material in said transporting step (ii), said cake material not being resuspendable by vigorous agitation.

2. A method according to claim 1, wherein said amount of HNO₃ is between about 0.25 weight percent and about 5 weight percent.

3. A method according to claim 1, wherein the amount of HNO₃ is between about 0.5 weight percent and about 3.5 weight percent.

4. A method according to claim 1, wherein said HNO₃ is admixed as a concentrated nitric acid containing at least about 70% of HNO₃.

5. A method according to claim 4, further comprising the step of:
(iii) at the completion of said transporting step (ii) adding water to said black acid in an amount sufficient to clarify said black acid.

* * * * *